March 2, 1971  D. SCARAMUCCI  3,567,258
SEAL ASSEMBLY
Filed March 10, 1969  3 Sheets-Sheet 1

INVENTOR.
DOMER SCARAMUCCI
BY
Dunlap, Laney, Hessin & Dougherty
ATTORNEYS March 2, 1971  D. SCARAMUCCI  3,567,258
SEAL ASSEMBLY Filed March 10, 1969  3 Sheets-Sheet 2

INVENTOR.
DOMER SCARAMUCCI
BY
Dunlap, Laney, Hessin & Dougherty
ATTORNEYS

March 2, 1971 D. SCARAMUCCI 3,567,258
SEAL ASSEMBLY
Filed March 10, 1969 3 Sheets-Sheet 3

INVENTOR.
DOMER SCARAMUCCI
BY
Dunlap, Laney, Hessin & Dougherty
ATTORNEYS

United States Patent Office 3,567,258
Patented Mar. 2, 1971

3,567,258
SEAL ASSEMBLY
Domer Scaramucci, 3245 S. Hattie,
Oklahoma City, Okla. 73129
Filed Mar. 10, 1969, Ser. No. 805,742
Int. Cl. F16l 25/00
U.S. Cl. 285—334.4
33 Claims

ABSTRACT OF THE DISCLOSURE

A seal ring to form a fluid tight seal between a pair of connecting members particularly useful in high pressure applications, wherein the initial sealing engagement is established by causing various internal mechanical stresses in the seal ring, and wherein the seal ring is disposed between the connectors such that the load caused by tightening the bolts between the connectors is not carried by the seal ring, and such that the seal ring may quickly and easily be removed for replacement or repair.

BACKGROUND OF THE INVENTION

(1) Field of the invention

This invention relates generally to improvements in gaskets for between-flange sealing, and more particularly, but not by way of limitation, to an improved seal ring to form a fluid tight seal between a pair of connecting members.

(2) Description of prior art

The problem of providing a fluid tight seal between a pair of connecting members is exceptionally critical in those applications involving high pressure. Generally in these applications a metal or a combination of a metal and some elastomeric type material is used to form the seal.

In the past there have been various designs for seal gaskets to seal between two connecting members. One such seal gasket is used between a pair of connecting members having a groove formed in the end face of each connecting member. The gasket is disposed generally between the connecting members, and a portion of the seal gasket is disposed in the groove of each connecting member. The bolts which hold the connecting members in assembled relationship are tightened, and the seal gasket forms a seal between the connecting members.

It is apparent that this type of seal gasket requires a special groove to be formed in the end face of each connecting member. This requirement substantially reduces the interchangeability of the connecting members in the field. It should also be noted that to replace or repair a seal gasket of this type, it is necessary to separate the connecting members a sufficient distance to allow the removal of the seal gasket. It is generally necessary to separate the connecting members a distance slightly in excess of the axial width of the particular seal gasket. In many installations the connecting members are so connected with other components, that it is extremely difficult to separate the connecting members this required distance.

Since the sealing engagement is initially created by tightening the bolts, the axial load imposed by this tightening is carried to a substantial degree by the seal gasket. In many applications, particularly those involving a vibratory type service, this load on the seal gasket results in a premature destruction of the seal gasket.

There have been seal gaskets designed such that a groove need only be formed in one of the connecting members. This type of seal gasket generally relies primarily on a spring tension force to establish the initial sealing engagement between the two connecting members, and some are of the pressure augmented type, at least to some degree.

The use of a spring tensioning force is not as desirable as a mechanical stress relationship for establishing the initial sealing engagement, because of the inherent limitations of the amount of force which can be utilized and the wearing characteristics of the spring. However this type of seal gasket does eliminate to some degree the possibility of damage to the seal gasket resulting from an over tightening of the connecting bolts.

SUMMARY OF THE INVENTION

The present invention contemplates a seal assembly basically comprising: a first connecting member, a second connecting member and an annular seal ring disposed therebetween. The first connecting member has an end face surface on one end thereof, and an opening therethrough intersecting the end face surface to allow the flow of fluid therethrough. An annular groove is formed in the end face surface thereby providing an annular surface therein. The second connecting member has an end face surface on one end thereof shaped to matingly abut the end face surface of the first connecting member. An opening is provided through the second connecting member intersecting the end face surface thereof to allow the flow of fluid therethrough. Means is provided to secure the first connecting member to the second connecting member with the mating end face surfaces of the first and second connecting members in an abutting relationship such that a portion of the opening in the first connecting member is in communication with a portion of opening and second connecting member to allow the flow of fluid therebetween. The annular seal ring has a plurality of sides, and is generally disposed in the annular groove of the first connecting member. The sides are sized such that in the relaxed position of the annular seal ring a portion of the seal ring protrudes from the groove beyond the end face surface of the first connecting member. The sides of the annular seal ring are also sized such that when the end face surfaces of the first and second connecting members are secured in an abutting relationship, a portion of the first of the sides of the seal ring sealing engages the end face surface of the second connecting member. In this position, a portion of a second of the sides of the seal ring sealingly engages the annular surface of the groove in the first connecting member, and the annular seal ring is twisted in the direction augmenting the sealing engagement between the first of the sides and the end face surface of the second connecting member and augmenting the sealing engagement between the second of the sides and the annular surface. In this position also a third side of the seal ring is exposed to the fluid flowing between the first and second connecting members such that the fluid pressure augments the sealing engagement between the first side and the annular surface of the groove in the first side and the annular surface of the groove in the first connecting member, and between the second side and the end face surface of the second connecting member, thereby forming a fluid tight seal between the first and second connecting members.

An object of the invention is to provide a seal ring capable of forming a fluid tight seal between a pair of connecting members.

Another object of the invention is to provide a seal ring wherein the sealing between the connecting members is established by an inward radial tensioning of the seal ring.

A further object of the invention is to provide a seal ring where the sealing engagement is augmented by a twisting or mechanical stress set up in the seal ring.

A still further object of the invention is to provide a seal ring wherein the sealing engagement is augmented by the pressure of fluid flowing therethrough.

One additional object of the invention is to provide a seal ring wherein the connecting members can be radially separated without having to axially separate the connecting members.

Another object of the invention is to provide a seal ring which will not be damaged due to excess tightening of the interconnecting bolts.

A still further object of the invention is to provide a seal ring which is economical in construction and operation.

Other objects and advantages of the invention will be evident from the following detailed description when read in conjunction with the accompanying drawings, which illustrate various embodiments.

Figure 1:
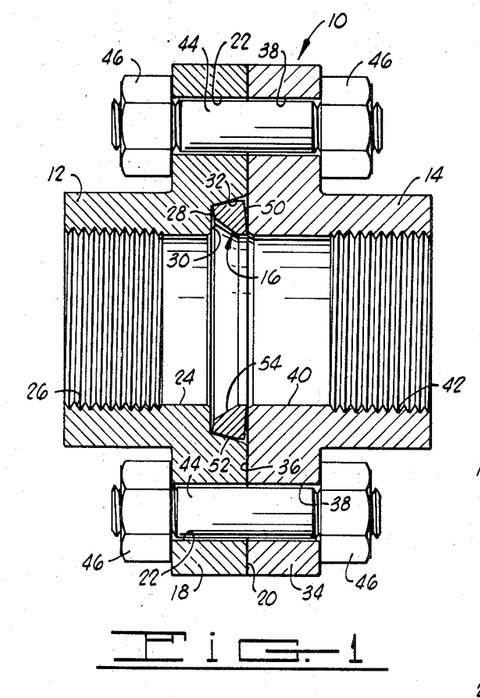
FIG. 1 is a sectional view of a seal assembly.
Figure 2:
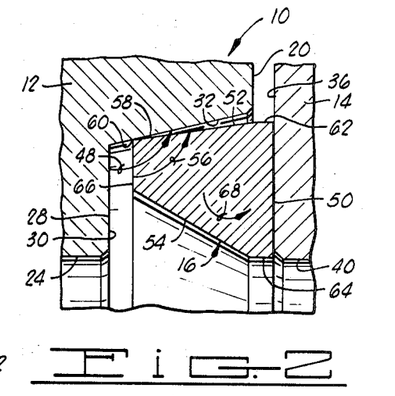
FIG. 2 is a partial sectional view of the annular seal ring, shown in FIG. 1, in its relaxed position.
Figure 3:
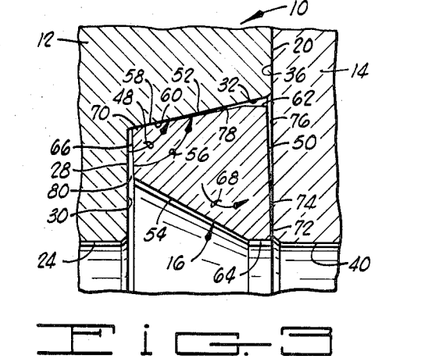
FIG. 3 is a partial sectional view similar to FIG. 2, but showing the annular seal ring in an assembled position.

EMBODIMENT OF FIGS. 1 THROUGH 3

Referring to the drawings in detail, and to FIG. 1 in particular, shown therein and designated by the general reference character 10 is a seal assembly constructed in accordance with the invention. The seal assembly 10 basically comprises: a first connecting member 12, a second connecting member 14 and an annular seal ring disposed therebetween, and designated by the general reference character 16.

A flange portion 18 is formed on one end of the first connecting member 12 and extends generally radially therefrom. The flange portion 18 includes an end face 20 and a plurality of apertures 22 which extend therethrough. A bore 24 extends through the first connecting member 12 intersecting the end face 20 of the flange portion 18. One end of the bore 24 is provided with a threaded portion 26 which is sized to receive the threaded end of a conduit (not shown).

An annular groove 28 is formed in the end face 20 of the first connecting member 12, and a portion thereof intersects the bore 24. The groove 28 forms an annular wall 30 and an annular surface 32 in the first connecting member 12, which will be described in greater detail hereinafter.

A flange portion 34 is formed on one end of the second connecting member 14 and extends generally radially therefrom. The flange portion 34 includes an end face 36 and a plurality of apertures 38 which extend therethrough. The end face 36 of the second connecting member 14 is shaped to matingly abut the end face 20 of the first connecting member 12 when the seal assembly 10 is in an assembled position, as shown in FIG. 1.

A bore 40 extends through the second connecting member 14 intersecting the end face 36 of the flange portion 34. One end of the bore 40 is provided with a threaded portion 42 which is sized to receive the threaded end of a conduit (not shown).

The first and second connecting members 12 and 14 and the seal ring 16 are held in an assembled relationship by a plurality of threaded bolts 44 which extend through the apertures 22 and 38 of the first and second connecting members 12 and 14, respectively. Each of the bolts 44 is provided with a pair of threaded nuts 46 that engage the flange portions 18 and 34 of the first and second connecting members 12 and 14, respectively.

As shown more clearly in FIG. 2, the wall 30 of the groove 28 intersects the bore 24 of the first connecting member 12, and is shaped normal to the center line axis of the seal ring 16. It should be noted, that the term "center line axis of the seal ring," as used hereinabove and hereinafter, refers to the axial center line axis of the seal ring 16, or the modifications thereof as the case may be, when the seal ring is in an assembled position with respect to the connecting members. The surface 32 of the groove 28 extends angularly from the wall 30, in a generally axial direction, and intersects the end face 20 of the first connecting member 12. The surface 32 forms a groove angle 48 with respect to a line normal to the center line axis of the seal ring 16.

The seal ring 16 is shown in FIG. 2 in its relaxed position, that is, in the position wherein the nuts 46 have not been tightened on the bolts 44. The seal ring 16 basically comprises: a first side 50, a second side 52 and a third side 54. The first side 50 is shaped normal to the center line axis of the seal ring 16. The third side 54 is angularly disposed with respect to the center line axis of the seal ring 16, and is exposed to the pressure of the fluid flowing between the first and second connecting members 12 and 14. The second side 52 generally forms the outer periphery of the seal ring 16, and extends at a ring angle 56 with respect to a line normal to the center line axis of the seal ring 16. The ring angle 56 is less than the groove angle 48, for reasons which will become apparent hereinafter.

The outer periphery of a portion 58 of the second side 52 is sized such that the portion 58 will initially contact the surface 32 of the groove 28 at a portion 60 thereof. The portion 60 of the surface 32 is a sufficient axial distance from the wall 30 and the axial width of the seal ring 16 is sized with respect to the groove 28 such that the portion 58 of the second side 52 will contact the portion 60 of the surface 32 before the seal ring 16 has been completely inserted in the groove 28. Therefore, as shown in FIG. 2, a portion of the seal ring 16 will protrude from the groove 28 beyond the end face 20 of the first connecting member 12 when the seal ring 16 is in a position wherein the portion 58 of the second side 52 has initially contacted the portion 60 of the surface 32.

A flat portion 62 extends generally between one end of the first side 50 and one end of the second side 52 and is parallel to the center line axis of the seal ring 16. A second flat portion 64 extends generally between one end of the first side 50 and one end of the third side 54, and is also parallel to the center line axis of the seal ring 16. A third flat portion 66 extends generally between one end of the second side 52 and one end of the third side 54, and is normal to the center line axis of the seal ring 16. The flat portions 62, 64, and 66 eliminate the existence of sharp edges formed between the sides 50, 52, and 54 of the seal ring 16, and therefore provide a more sturdy structure which is not as susceptible to damage in normal operation.

The flat portion 66 generally between the second side 52 and the third side 54 also permits the angular disposition of the third side 54 to be varied to give the desirable strength and pressure characteristics, and yet limit the axial width of the seal ring 16. The axial width of the seal ring 16, that is the axial width between the first side 50 and the flat portion 66 thereof, is sized such that the flat portion 66 will not abut the wall 30 of the groove 28 when the seal ring 16 is in an assembled position, as shown in FIGS 1 and 3, for reasons which will be made more apparent hereinafter.

OPERATION OF FIGS. 1 THROUGH 3

The seal ring 16 is generally disposed in the groove 28 of the first connecting member 12, to a position wherein the portion 58 of the second side 52 has initially contacted the portion 60 of the surface 32. In this position, a portion of the seal ring 16 generally adjacent the first side 50 thereof will protrude from the groove 28 beyond the end face 20 of the first connecting member 12.

The second connecting member 14 is then placed in a position wherein the end face 36 thereof generally faces the end face 20 of the first connecting member 12, and the apertures 38 of the second connecting member 14 are aligned with the apertures 22 of the first connecting member 12. In this position, the end face 36 of the second connecting member 14 will abut the first side 50 of the seal ring 16, as shown in FIG. 2.

The bolts 44 are extended through the respective apertures 22 and 38 in the first and second connecting members 12 and 14, and the nuts 46 are threaded on the opposite ends of each bolt 44. The end faces 20 and 36 of the first and second connecting members 12 and 14, respectively, will be drawn toward an abutting relationship as the nuts 46 are tightened on the bolts 44. The end face 36 of the second connecting member 14 will contact the first side 50 of the seal ring 16, and will move the seal ring 16 axially into the groove 28, as the nuts 46 are so tightened.

As the seal ring 16 is moved toward the wall 30 of the groove 28, the second side 52 will be moved downwardly along the surface 32. Since the outer periphery formed by the portion 58 of the second side 52 is sized to be less than the periphery formed by the portion 60 of the surface 32, an interference fit is established between the portion 58 and that portion of the surface 32 between the annular wall 30 and the portion 60. This interference type fit will result in a radial inward tensioning of the seal ring 16. The radial inward tensioning sets up a mechanical stress in the annular seal ring 16, thereby establishing a sealing relationship between the first side 50 and the end face 36 of the second connecting member and also between the second side 52 and the surface 32 of the groove 28. The radial inward tensioning of the seal ring 16 therefore establishes a seal between the first and second connecting members 12 and 14, respectively.

Since the surface 32 is formed on a groove angle 48, the seal ring 16 will be twisted in a general direction 68, as the seal ring 16 is moved inward beyond the portion 60 of the surface 32 toward the wall 30. The twisting of the seal ring 16 sets up an additional mechanical stress in the seal ring 16, and creates concentrated bearing and sealing points 70 and 72 between the portion 58 of the second side 52 and the portion 60 of the surface 32, and between a portion 74 of the first side 50 and a portion of the end face 36 of the second connecting member 14. The twisting of the seal ring 16 in this manner therefore augments the sealing relationship established between the first and second connecting members 12 and 14 by the radial inward tensioning of the seal ring 16.

The twisting of the seal ring 16 in the direction 68 will cause a portion of the first side 50 opposite the bearing and sealing point 72 end to be lifted from contact with the end face 36 of the second connecting member 14, thereby leaving a gap 76 between a portion of the end face 36 and a portion of the first side 50 when the seal ring 16 is in the assembled position, as shown in FIGS. 1 and 3. The twisting of the seal ring 16 will also cause the second side 52 to be moved generally toward the surface 32 of the groove 28. However, the ring angle 56 is sized to be smaller than the groove angle 48, so that when seal ring 16 is twisted into the assembled position a gap 78 will exist between a portion of the second side 52 opposite the bearing and sealing portion 70 and a portion of the surface 32. The particular size of the gap 78 is not critical, but it is important that the ring angle 56 be sized with respect to the groove angle 48 so that the portion of the second side 52 opposite the bearing and sealing point 70 end does not contact the surface 32 when the seal ring 16 is placed in the assembled position. Therefore, the gap 78 prevents this additional contacting between the second side 52 and the surface 32, which would result in a shift of the sealing area therebetween, and a loss of a portion of the mechanical sealing advantage of the seal ring 16.

In a preferred form, the size of ring angle 56 should be as close to the size of the groove angle 48 as possible, yet remaining consistent with the limitations discussed hereinabove. The closer the two angles 56 and 48 are to being the same size, the larger the portion 58 becomes, thereby increasing the sealing contacting area between the second side 52 and the surface 32.

Since the axial width of the seal ring 16 is sized to be less than the axial depth of the groove 28, a gap 80 will exist between the flat portion 66 of the seal ring 16 and the wall 30 of the groove 28 when the seal ring 16 is in an assembled position. The primary purpose of the gap 80 is to prevent the load exerted by tightening the bolts 44 from being carried by the seal ring 16.

The internal pressure exerted by the fluid flowing through the first and second connecting members 12 and 14 acts upon the third side 54 and the flat portion 66 of the seal ring 16, and urges the seal ring 16 generally toward the intersection of the surface 32 of the groove 28 and the end face 36 of the second connecting member 14, thereby increasing the sealing relationship established at the bearing and sealing points 70 and 72. It is therefore apparent that the internal fluid pressure augments the sealing relationship initially established between the first and second connecting members 12 and 14 by the radial inward tensioning and the twisting of the seal ring 16.

From the foregoing it is apparent that the seal assembly 10 provides a seal ring which is capable of forming a fluid tight seal between a pair of connecting members. The seal ring 16 as described hereinbefore provides a structure wherein the seal between the first and second connecting members 12 and 14 is initially established by radial inward tensioning and twisting the ring 16. This type of seal ring is particularly useful in high pressure applications, and the seal ring as described herein also has the advantage of forming a pressure augmented type seal.

Since the seal ring 16, in an assembled position, does not abut the wall 30 of the groove 28, the seal ring 16 will not be damaged if the joint between the connecting members is made too tight. The force resulting from tightening the joint between the connecting members is carried by connecting members, and is not exerted directly on the seal ring.

The seal ring 16 is also constructed such that a groove need only be formed in the end face of one of the connecting members. This type of construction not only permits a greater flexibility and interchangeability of connecting members used in the field, but also eliminates the necessity of having to move one of the connecting members a sufficient axial length from the other connecting member to clear the seal ring before the connecting member can be removed and the seal ring replaced.

Figure 4:
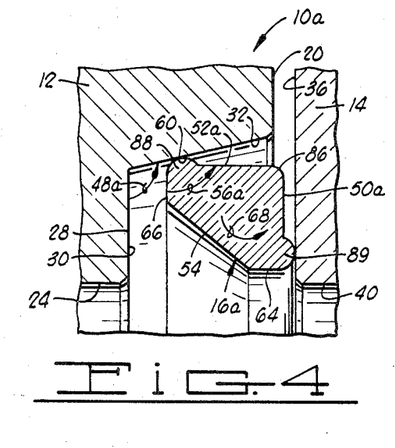
FIG. 4 is a view similar to FIG. 2, but showing a modified annular seal ring.
Figure 5:
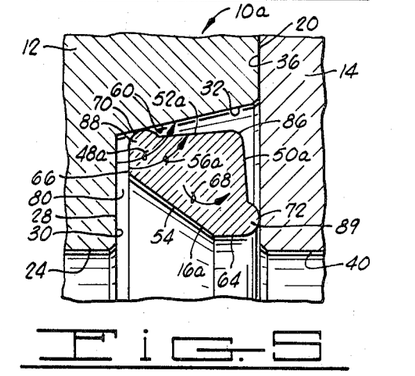
FIG. 5 is a view similar to FIG. 4, but showing the modified seal ring of FIG. 4 in an assembled position.

EMBODIMENTS OF FIGS. 4 AND 5

A modified seal assembly 10a is shown in FIGS. 4 and 5, and is constructed exactly like the seal assembly 10 shown in FIGS. 1, 2, and 3, except as hereinafter described.

A modified seal ring 16a is disposed between the first and second connection members 12 and 14. The seal ring 16a is shown in FIG. 4 in its relaxed position, and as shown therein the seal ring 16a does not have a flat portion between the first side 50a and the second side 52a, but rather has a rounded portion 86 therebetween.

An annular bead 88 is formed on the second side 52a adjacent the flat portion 66. The outer periphery of the bead 88 is sized such that the bead 88 will initially contact the surface 32 of the groove 28 at the portion 60 thereof.

The axial width of the seal ring 16a is sized similar to the axial width of the seal ring 16, and therefore a portion of the seal ring 16a will protrude from the groove 28 beyond the end face 20 of the first connecting member 12 when the seal ring 16a is in the position wherein the bead 88 has initially contacted the portion 60 of the surface 32.

A second annular bead 89 is formed on the first side 50a adjacent the flat portion 64. The second bead 89 is sized and disposed to sealingly contact the end face 36 of the second connecting member 14.

From the foregoing it is apparent, that the basic difference between the seal ring 16a and the seal ring 16 is that in lieu of the substantially flat contact areas between the first and the end face 36, and between the second side 52 and the surface 32 when using the seal ring 16, the seal ring 16a has the beads 88 and 89 formed thereon to establish the sealing contact areas.

OPERATION OF FIGS. 4 AND 5

The operation of seal ring 16a is similar to the operation of the ring 16. The seal ring 16a is positioned in the groove 28 of the first connecting member 12, and the second connecting member 14 is placed in a position wherein the end face 36 thereof generally faces the end face 20 of the first connecting member 12. The end faces 20 and 36 of the first and second connecting members 12 and 14 are then drawn toward an abutting relationship as the nuts 46 are tightened on the bolt 44.

The end face 36 on the second connecting member 14 will contact the second bead 89 of the first side 50a and move the seal ring 16a toward the wall 30 of the groove 28. The bead 88 of the second side 52a will be moved downwardly along the surface 32. Since the outer periphery formed by the bead 88 of the second side 52a is sized to be less than the periphery formed by the portion 60 of the surface 32, an interference fit is established between the bead 88 and that portion of the surface 32 between the wall 30 and the portion 60 thereof. This interference type fit will result in a radial inward tensioning of the seal ring 16a, thereby establishing a sealing relationship between the bead 88 and the surface 32, and between the bead 89 and the end face 36 of the second connecting member.

As the seal ring 16a is moved inward beyond the portion 60 of the surface 32 toward the wall 30, the seal ring 16a will be twisted in a direction 68 similar to that previously described with respect to the seal ring 16. The twisting of the seal ring 16a operates to create the concentrated bearing and sealing points 70 and 72 between the bead 88 and the portion 60 of the surface 32, and between the bead 89 and a portion of the end face 36 of the second connecting member 14. The twisting of the seal ring 16a will augment the sealing relationship established previously by the radial inward tensioning of the seal ring 16a.

The twisting of the seal ring 16a will move a portion of the first side 50a in a direction generally away from the end face 36 of the second connecting member 14, and will move a portion of the second side 52a in a direction generally toward the surface 32 of the groove 28. The ring angle 56a is less than the groove angle 48a by a sufficient amount so that the second side 52a will not contact the surface 32 when the seal ring 16a is in an assembled position, as shown in FIG. 5. In this respect, the considerations to be made in sizing the ring angle 56a and the groove angle 48a are identical to those previously described with respect to the seal assembly 10, shown in FIGS. 1, 2, and 3. However, with respect to the seal ring 16a, the ring angle 56a need not be sized to be as close as possible to the size of the groove angle 48a. Since the sealing contact area is established between the bead 88 and the surface 32, the size of the gap between the second side 52a and the surface 32 when the seal ring 16a is in an assembled position is not as critical in this embodiment of the invention.

The seal ring 16a is pressure augmented in the same manner as previously described with respect to the seal ring 16 by the internal pressure exerted by the fluid acting against the third side 54.

It is apparent that this embodiment of the invention retains all of the advantages described with respect to the embodiment of the invention shown in FIGS. 1, 2, and 3. In addition, the seal ring 16a has the additional advantages of providing a more positive sealing contact area between the seal ring 16a and the surface 32 of the groove 28, and between the end face 36 of the second connecting member 14, and reducing the tolerance requirements of the ring and groove angles 48a and 56a, respectively.

Figure 6:
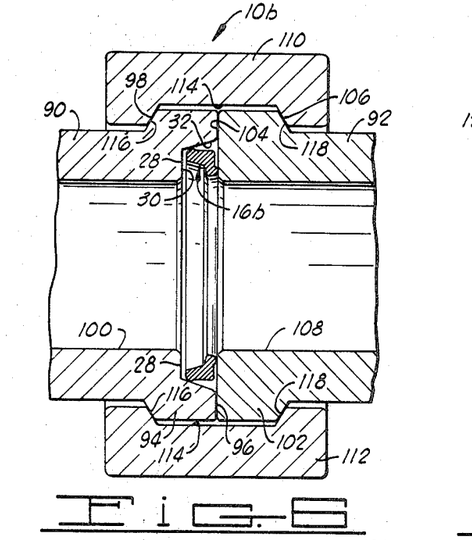
FIG. 6 is a sectional view of a modified seal assembly.
Figure 7:
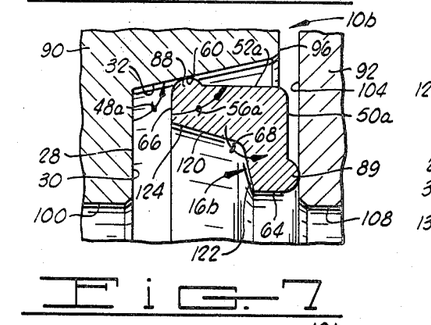
FIG. 7 is a partial sectional view of the modified annular seal ring, shown in FIG. 6, in its relaxed position.
Figure 8:
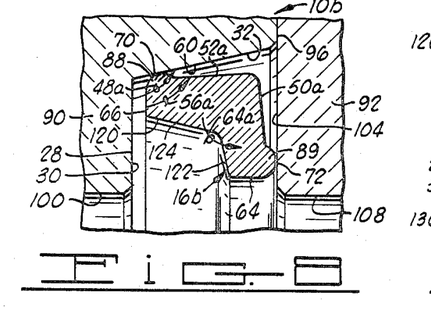
FIG. 8 is a partial sectional view similar to FIG. 7, but showing the modified annular seal ring in an assembled position.

EMBODIMENT OF FIGS. 6 THROUGH 8

The modified seal assembly 10b, shown in FIGS. 6, 7, and 8, is only a slight variation from the seal assemblies described hereinbefore. The seal assembly 10b basically comprises a first connecting member 90, a second connecting member 92 and an annular seal ring 16b disposed therebetween.

A flange portion 94 is formed on one end of the first connecting member 90 and extends generally radially therefrom. The flange portion 94 includes an end face 96 and an angular annular surface 98, which is formed on one end of the flange portion 94 opposite the end face 96. A bore 100 extends through the first connecting member 90 intersecting the end face 96 of the flange portion 94.

A groove is formed in the end face 96 of the first connecting member 90 and a portion thereof intersects the bore 100. The groove is identical to the grooves previously described with respect to the seal assembly 10 and the seal assembly 10a, and is therefore designated by the numeral 28 in the FIGS. 6, 7, and 8.

A flange portion 102 is formed on one end of the second connecting member 92 and extends generally radially therefrom. The flange portion 102 includes an end face 104 and an angular annular surface 106, which is formed on one end of the flange portion 102 opposite the end face 104. The end face 104 of the second connecting member 92 is shaped to matingly abut the end face 96 of the first connecting member 90 when the seal assembly 10b is in an assembled position, as shown in FIGS. 6 and 8. A bore 108 extends through the second connecting member 92 intersecting the end face 104 of the flange portion 102.

The first and second connecting members 90 and 92 and the seal assembly 16b are held in an assembled relationship by upper and lower clamps 110 and 112. Each clamp 110 and 112 has a groove 114 formed therein, which encircles the inner periphery of the clamps 110 and 112. Each groove 114 forms a pair of angularly extending surfaces 116 and 118. The surface 116 of each clamp 110 and 112 is sized to matingly and slidingly engage the annular surface 98 of the first connecting member 90, and the surface 118 is sized to matingly and slidingly engage the annular surface 106 of the second connecting member 92.

Each clamp 110 and 112 is sized to encircle about one-half of the outer peripheries of the first and second connecting members 90 and 92, and is provided with a radially extending flange (not shown) on each end thereof by means of which the clamps 110 and 112 can be bolted together. Clamps of this type are well known in the art, and no further description is required herein.

The seal ring 16b, shown in its relaxed position in FIG. 7, is constructed exactly like the ring 16a shown in FIGS. 4 and 5, except in lieu of the substantially flat angular side 54 of the seal ring 16a, a recess 120 is formed between the flat portions 64 and 66 of the seal ring 16b. The recess 120 forms annular walls 122 and 124 in the seal ring 16b.

OPERATIONS OF FIGS. 6 THROUGH 8

The seal ring 16b is generally disposed in the groove 28 of the first connecting member 90, in a manner exactly like that described with respect to the seal ring 16a. The second connecting member 92 is then placed in the position wherein the end face 104 thereof generally faces the end face 96 of the first connecting member 90.

The clamp 110 is disposed on the upper portions of the first and second connecting members 90 and 92, in a position wherein the annular surfaces 116 and 118 of the clamp 110 initially engage a portion of the annular surfaces 98 and 106 of the first and second connecting members 90 and 92 respectively. The clamp 112 is disposed on the lower portions of the first and second connecting members 90 and 92, in a position wherein the annular surfaces 116 and 118 of the clamp 112 initially engage a portion of the annular surfaces 98 and 106 of the first and second connecting members 90 and 92 respectively.

The bolts are tightened, thereby drawing the clamps 110 and 112 generally toward each other. It is apparent from FIG. 6, that as the clamps 110 and 112 are drawn toward each other, the annular surfaces 116 and 118 of each clamp 110 and 112 will move along the annular surfaces 98 and 106 of the connecting members 90 and 92 respectively, thereby moving the end faces 96 and 104 of the first and second connecting members 90 and 92 into an abutting relationship.

It is apparent from the foregoing, that the end faces 96 and 104 of the first and second connecting members 90 and 92 and the groove 28 of the first connecting member 90 will cooperate with the seal ring 16b and provide a fluid tight seal between the first and second connecting members 90 and 92, in a manner exactly like that previously described with respect to the seal ring 16a. However, the pressure exerted by the fluid flowing through the connecting member 90 and 92 will be exerted upon the walls 122 and 124 of the recess 120. The shape of the annular walls 122 and 124 with respect to the surface 32 of the groove 28, and with respect to the end face 104 of the second connecting member 92, directs the resultant pressure forces such that the pressure forces are more efficiently utilized to augment the sealing engagement between the seal ring 16b and the first and second connecting members 90 and 92. Tests have been conducted using an all metal seal ring constructed exactly like the seal ring 16b shown in FIGS. 6 through 8, and the results of these tests show that the seal ring 16b will hold a fluid tight seal at 3,000 p.s.i. with approximately .030 to .040 inch clearance gap at one side of a misaligned end face.

The seal ring 16b therefore retains all of the advantages of the seal ring 16a and yet provides the additional advantage of having a more efficient utilization of the fluid pressure to augment the sealing engagement between the seal ring 16b and the connecting members 90 and 92.

Figure 9:
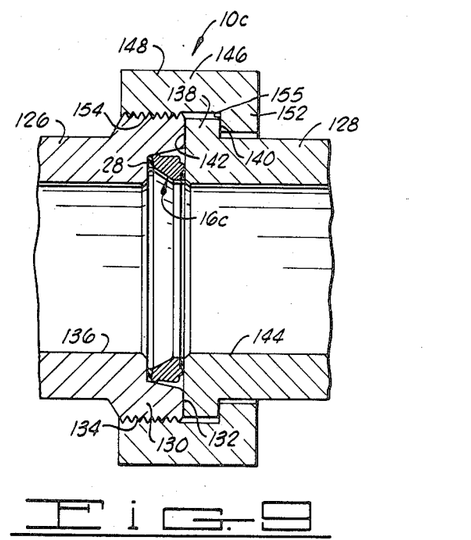
FIG. 9 is a sectional view of another modified seal assembly.
Figure 10:
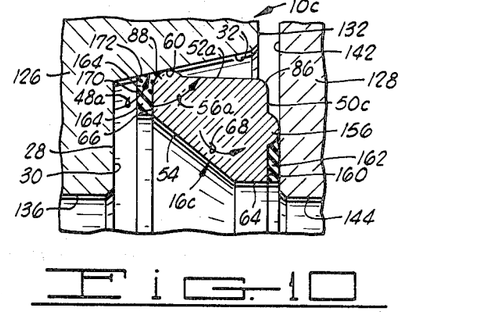
FIG. 10 is a partial sectional view of the modified annular seal ring, shown in FIG. 9, in its relaxed position.
Figure 11:
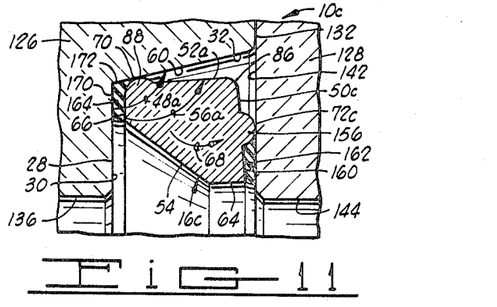
FIG. 11 is a partial sectional view similar to FIG. 10, but showing the modified annular seal ring in an assembled position.

EMBODIMENTS OF FIGS. 9 THROUGH 11

The seal assembly 10c shown in FIGS. 9 through 11 is similar to the seal assemblies 10a and 10b described hereinbefore. The seal assembly 10c basically comprises a first connecting member 126, a second connecting member 128 and an annular seal ring 16c disposed therebetween.

A flange portion 130 is formed on one end of the first connecting member 126, and extends generally radially therefrom. The flange portion 130 includes an end face 132 which is formed on one end thereof, and a threaded portion 134 which is formed on the outer periphery of the flange portion 130. A bore 136 extends through the first connecting member 126 intersecting the end face 132 thereof. The groove 28 formed in the end face 132 of the first connecting member 126 is identical to the groove 28 of the seal assemblies 10, 10a and 10b described hereinbefore.

A flange portion 138 is formed on one end of the second connecting member 128 and extends generally radially therefrom. The flange portion 138 forms an annular wall 140 which extends around the outer periphery of the second connecting member 128, and includes an end face 142 which is shaped to matingly abut the end face 132 of the first connecting member 126. A bore 144 extends through the second connecting member 128 intersecting the end face 142 of the flange portion 138.

The first and second connecting members 126 and 128 and the seal ring 16c are held in an assembled relationship by a coupling 146. The coupling 146 is generally L-shaped having leg portions 148 and 152 thereon. In the assembled position, as shown in FIG. 9, the leg portion 148 extends in an axial direction with respect to the first and second connecting members 126 and 128, and the leg portion 152 extends generally perpendicular from one end of the leg portion 148. A portion of the inner periphery of leg portion 148 has a threaded portion 154 formed therin. The threaded portion 154 is sized to threadingly engage the threaded portion 134 of the flange portion 130. The potrion 152 forms an annular surface 155 which is sized to engage the annular wall 140 of the flange portion 138 when the seal assembly 10c is in an assembled position, as shown in FIGS. 9 and 11.

The seal ring 16c, shown in relaxed position in FIG. 10, is constructed exactly like the seal ring 16a shown in FIGS. 4 and 5, except as hereinafter described. In lieu of a bead 89 formed on the first side 50 adjacent flat portion 64, an annular bead 156 is formed on the first side 50c and is spaced radially from the flat portion 64, thereby providing a portion 160 on the first surface 50c between the bead 156 and the flat portion 64.

An elastomeric seal pad 162 is bonded to the portion 160 of the first side 50c, and a portion of the seal pad 162 is also bonded to a portion of the bead 156. The seal pad 162 is sized and disposed to sealingly engage the end face 142 of the second connecting member 128 when the seal assembly 10c is in an assembled position, as shown in FIGS. 9 and 11.

A second elastomeric pad 164 is bonded to the flat portion 66 of the annular seal ring 16c, and a portion of the elastomeric pad 164 is also bonded to a portion of the head 88 of the second side 52a. The outer end 170 and the outer periphery 172 of the second elastomeric pad 164 are sized and disposed to sealingly engage a portion of the wall 30 and a portion of the surface 32 of the groove 28 respectively when the seal assembly 10c is in an assembled position.

OPERATION OF FIGS. 9 THROUGH 11

The seal ring 16c is generally disposed in the groove 28 of the first connecting member 126, in a position similar to that previously described with respect to the seal ring 16a, shown in FIGS. 4 and 5. The second connecting member 128 is then placed in a position wherein the end face 142 thereof generally faces the end face 132 of the first connecting member 126, and wherein the end face 142 is generally adjacent the bead 156 of the seal ring 16c, as shown in FIG. 10.

The coupling 146 is disposed generally around the second connecting member 128 to a position wherein the threaded portion 154 of coupling 146 initially engages the threaded portion 134 of the flange 130. In this position, the annular surface 155 of the coupling 146 will engage the annular wall 140 of the second connecting member 128. The coupling 146 is then rotated about the first and second connecting members 126 and 128, and is threaded to the flange portion 130 of the first connecting member 126. It is apparent that as the coupling 146 is threaded onto the first connecting member 126, the annular surface 155 of the coupling 146 will engage the annular wall 140 of the second connecting member 128 and will move the second connecting member 128 in a direction toward the first connecting member 126, to a position wherein the end face 142 of the second connecting member 128 abuts the end face 132 of the first connecting member 126, as shown in FIGS. 9 and 11.

As the seal rng 16c is moved inwardly beyond the portion 60 of the surface 32 toward the wall 30, the seal ring 16c will be tensioned in a radial inward direction and twisted in a direction 68, thereby establishing the sealing engagement and the concentrated bearing and sealing points 70 and 72c between the seal ring 16c and the first and second connecting members 126 and 128, in a manner like the seal ring 16a. This sealing engagement is also pressure augmented by the fluid pressure acting on the third side 54 of the seal ring 16c.

It is apparent that the seal ring 16c retains all of the advantages described with respect to the seal ring 16a described hereinbefore. In addition, the seal ring 16c provides the additional sealing engagement established between the elastomeric pads 162 and 164 and the end face 142 of the second connector 128 and between the wall 30 and the surface 32 of the groove 28. The pads 162 and 164 are each trapped, when the seal ring 16c is in operating position, to assure positive sealing.

Figure 12:
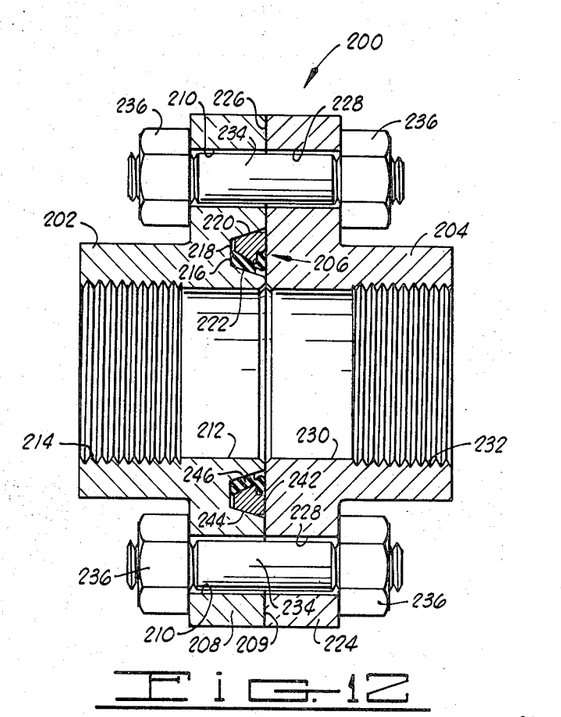
FIG. 12 is a sectional view of another modified seal assembly.
Figure 13:
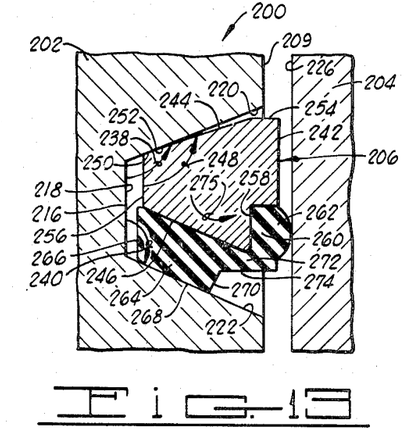
FIG. 13 is a partial sectional view of the modified annular seal ring, shown in FIG. 12, in its relaxed position.
Figure 14:
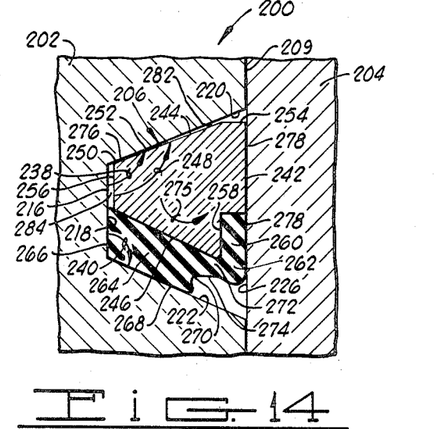
FIG. 14 is a partial sectional view similar to FIG. 13, but showing the modified annular seal ring in an assembled position.

EMBODIMENTS OF FIGS. 12 THROUGH 14

Shown in FIGS. 12, 13, and 14 is a modified seal assembly designated by the general reference character 200, which is constructed in accordance with the invention. The seal assembly 200 basically comprises: a first connecting member 202, a second connecting member 204 and an anuular seal ring 206 disposed therebetween.

A flange portion 208 is formed on one end of the first connecting member 202 and extends generally radially therefrom. The flange portion 208 includes an end face 209 and a plurality of apertures 210 which extend therethrough. A bore 212 extends through the first connecting member 202 intersecting the end face 209 of the flange portion 208. One end of the bore 212 is provided with a threaded portion 214 which is sized to receive the threaded end of a conduit (not shown). An annular groove 216 is formed in the end face 209 of the first connecting member 202. The groove 216 forms an annular wall 218 and a pair of annular surface 220 and 222 in the first connecting member 202, which will be described in greater detail hereinafter.

A flange portion 224 is formed on one end of the second connceting member 204 and extends generally radially therefrom. The flange portion 224 includes an end face 226 and a plurality of apertures 228 which extend therethrough. The end face 226 of the second connecting member 204 is shaped to matingly abut the end face 209 of the first connecting member 202 when the seal assembly 200 is in an assembled position, as shown in FIGS. 12 and 14. A bore 230 extends through the second connecting member 204 intersecting the end face 226 of the flange portion 224. One end of the bore 230 is provided with a threaded portion 232 which is sized to receive the threaded end of a conduit (not shown).

The first and second connecting members 202 and 204 and the seal ring 206 are held in assembled relationship by a plurality of threaded bolts 234 which extend through the apertures 210 and 228 of the first and second connecting members 202 and 204 respectively. Each bolt 234 is provided with a pair of threaded nuts 236 that engage the flange portions 208 and 224 of the first and second connecting members 202 and 204 respectively.

As shown more clearly in FIG. 13, the wall 218 is shaped normal to the center line axis of the seal ring 206. The surface 220 extends angularly from the wall 218 in a generally axial direction, and intersects the end face 209 of the first connecting member 202. The surface 220 forms a groove angle 238 with respect to a line normal to the center line axis of the seal ring 206. The surface 222 extends angularly from the wall 218 in a generally axial direction, and intersects the end face 209 of the first connecting member 202. The surface 222 forms an angle 240 with respect to a line normal to the center line axis of the seal ring 206.

The seal ring 206 is shown in FIG. 13 in its relaxed position, and as shown therein basically comprises a first side 242, a second side 244 and a third side 246. The first side 242 is shaped normal to the center line axis of the seal ring 206, and the third side 246 is angularly disposed with respect to the center line axis of the seal ring 206. The second side 244 generally forms the outer periphery of the seal ring 206 and extends at a ring angle 248 with respect to a line normal to the center line axis of the seal ring 206. The ring angle 248 is sized to be less than the groove angle 238.

The outer periphery of a portion 250 of the second side 244 is sized such that the portion 250 will initially contact the surface 220 of the groove 216 at a portion 252 thereof. The portion 252 of the surface 220 is a sufficient axial distance from the wall 218, and the axial width of the seal ring 206 is sized with respect to the groove 216, such that the portion 250 of the second side 244 will contact the portion 252 of the surface 220 before the seal ring 206 has been completely inserted in the groove 216. Therefore, as shown in FIG. 13, a portion of the seal ring 206 will protrude from the groove 216 beyond the end face 209 of the first connecting member 202 when the seal ring 206 is the position wherein the portion 250 of the second side 244 has initially contacted the portion 252 of the surface 220.

A flat portion 254 extends generally between one end of the first side 242 and one end of the second side 244 and is parallel to the center line axis of the seal ring 206. A second flat portion 256 extends generally between one end of the second side 244 and one end of the third side 246, and is normal to the center line axis of the seal ring 206. The flat portion 256, generally between the second side 244 and the third side 246, permits the angular disposition of the third side 246 to be varied to give the desirable strength and pressure characteristics, and yet limit the axial width of the seal ring 206. The axial width of the seal ring 206, that is the axial width between the first side 242 and the flat portion 256 thereof, is sized such that the flat portion 256 will not abut the wall 218 of the groove 216 when the seal ring 206 is in an assembled position, as shown in FIGS. 12 and 14, for reasons which will be made more apparent hereinafter.

A groove 258 is formed in the first side 242, and a portion thereof intersects the third side 246 of the seal ring 206. An annular elastomeric seal member 260 is bonded in the groove 258, and has a bead portion 262 which extends from the groove 258 beyond the first side 242.

An elastomeric pad 264 is bonded to the third side 246 of the seal ring 206. One end 266 of the elastomeric pad 264 is shaped normal to the center line axis of the seal ring 206, and is sized to extend a sufficient distance from the third side 246 beyond the flat portion 256 of the seal ring 206 to contact the wall 218 of the groove 216 when the seal ring 206 is in an assembled position, as shown in FIGS. 12 and 14. The inner periphery 268 of the elastomeric pad 264 is sized to sealingly engage the surface 222 of the groove 216. A groove 270 is formed on one end of the elastomeric pad 264 opposite the end 266 thereof, and intersects the inner periphery 268. A portion 272 having an inner periphery 274 extends from the groove 270 and connects the pad 264 with the elastomeric seal member 260.

OPERATIONS OF FIGS. 12 THROUGH 14

The seal ring 206 is disposed in the groove 216 of the first connecting member 202 to a position wherein the portion 250 of the second side 244 has initially contacted the portion 252 of the annular surface 220. In this position, a portion of the annular seal ring 206 generally adjacent the first side 242 thereof will protrude from the groove 218 beyond the end face 209 of the first connecting member 202.

The second connecting member 204 is then placed in a position wherein the end face 226 thereof generally faces the end face 209 of the first connecting member 202 and the apertures 228 of the second connecting member 204 are aligned with the apertures 210 of the first connecting member 202. In this position, the end face 226 of the second connecting member 204 will be adjacent the bead 262 of the seal ring 206 as shown in FIG. 13.

The bolts 234 are extended through the respective apertures 210 and 228 of the first and second connecting members 202 and 204, and the nuts 236 are threaded on the opposite ends of each bolt 234. The end faces 209 and 226 of the first and second connecting members 202 and 204 will be drawn toward an abutting relationship as the nuts 236 are tightened on the bolts 234. The end face 226 of the second connecting member 204 will contact the first side 242 of the seal ring 206, and will move the seal ring 206 axially into the groove 216 as the nuts 236 are so tightened.

As the seal ring 206 is moved toward the wall 218 of the groove 216, the second side 244 will move along the surface 220, and the inner periphery 268 of the elastomeric pad 264 will be moved along the surface 222 of the groove 216. Since the outer periphery formed by the portion 250 of the second side 244 is sized to be less than the periphery formed by the portion 252 of the surface 220, an interference fit is established between the portion 250 and that portion of the surface 220 between the annular wall 218 and the portion 252 of the surface 220. This interference fit will result in a radial inward tensioning of the seal ring 206. The radial inward tensioning of the seal ring 206 establishes a seal between the first and second connecting members 202 and 204 in a manner similar to that described hereinbefore with respect to the other embodiments of the invention.

Since the surface 220 is formed on a groove angle 238, the seal ring 206 will be twisted in a general direction 275 as the seal ring 206 is moved inward beyond a portion 252 of the surface 220 toward the wall 218. The twisting of the seal ring 206 sets up an additional mechanical stress in the seal ring 206, and creates concentrated bearing and sealing points 276 and 278 between the portion 250 of the second side 244 and the portion 252 of the surface 220, and between the bead 262 and the end face 226 of the second connecting member 204. The twisting of the seal ring 206 in this manner therefore augments the sealing relationship established between the first and second connecting members 202 and 204 by the radial inward tensioning of the seal ring 206.

The twisting of the seal 206 in the direction 275 causes a portion of the first side 242 opposite the bead 262 end, to be lifted from contact with the end face 226 of the second connecting member 204 thereby leaving a gap 278 between the portion of the end face 226 and a portion of the first side 242 when the seal ring 206 is in the assembled position, as shown in FIGS. 12 and 14. The twisting of the seal ring will also cause the second side 244 to be moved generally toward the annular surface 220 of the groove 216. However, the ring angle 248 is sized to be smaller than the groove angle 238 so that when the seal ring 206 is twisted into an assembled position, a gap 282 will exist between a portion of the second side 244 opposite the bearing and sealing point 276 end, and a portion of the annular surface 220. The particular size of the gap 282 is not critical, but it is important that the ring angle 248 be sized with respect to the groove angle 238 so that the portion of the second side 244 opposite the bearing and sealing point 276 end does not contact the surface 220 when the seal ring 206 is placed in an assembled position. Therefore, the gap 282 prevents an additional contacting between the second side 244 and the annular surface 220, which would result in a shift of the sealing area therebetween and a loss of a portion of the mechanical sealing advantage of the seal ring 206.

In a preferred form the size of the ring angle 248 should be as close to the size of the groove angle 238 as possible and yet remaining consistent with the limitations discussed hereinabove. The closer the two angles 238 and 248 are to being the same size, the larger the contact area 276 becomes, thereby increasing the sealing contact therein between the second side 244 and the surface 220.

Since the axial width of the seal ring 206 is sized to be less than the axial depth of the groove 216, a gap 284 will exist between the flat portion 256 of the seal ring 206 and the wall 218 of the groove 216 when the seal ring 206 is in an assembled position. The primary purpose of the gap 284 is to prevent the load exerted by tightening the bolts 234 from being carried by the seal ring 206.

The inner periphery 268 of the elastomeric pad 264 is sized to sealingly engage the surface 222 as the seal ring 206 is moved into an assembled position toward the wall 218 of the groove 216. The radial inward tensioning and the twisting of the seal ring in a direction 275 will augment the sealing engagement between the inner periphery 268 of the elastomer pad 264 and the surface 222 of the groove 216. As the seal ring 206 is moved to an assembled position, the end 266 of the elastomeric pad 264 will sealingly engage the annular wall 218 of the groove 216.

The internal pressure exerted by the fluid flowing through the first and second connecting members 202 and 204 will act upon the groove 270 and the inner periphery 274 of the elastomeric pad 264, thereby increasing or augmenting the sealing engagement between the elastomeric pad 264 and the surface 222 and between the bead 262 and the end face 226 of the second connecting member 204.

The surface 222 is angularly extended from the wall 218 of the groove 216 to facilitate the pressure augmenting characteristic described hereinabove. The exact size of the angle 240 is not critical and the primary purpose of extending the surface 222 of the groove 216 at an angle 240 is to provide a surface against which the fluid pressure can deform the seal member to establish the sealing engagement. If the surface 222 were parallel to the center line axis of the seal ring 206 most of the fluid pressure would be exerted in an axial direction to establish sealing engagement between the seal member and the wall 218.

It is apparent from the foregoing that the seal ring 206 retains all of the advantages of the seal rings described hereinbefore, in that the sealing engagement is initially established by a radial inward tensioning and a twisting of the seal ring 206, and the initial sealing engagement is augmented by the pressure of the fluid flowing between the connecting members. In addition the embodiment of the invention shown in FIGS. 12, 13, and 14 utilizes an elastomeric material which is more pressure responsive in such a manner as to increase the sealing contact area between the connecting members.

Changes may be made in the construction and arrangement of parts or elements of the various embodiments as disclosed herein without departing from the spirit and scope of the invention.

What is claimed is:
1. A seal assembly comprising:
a first connecting member having an end face surface on one end thereof and an opening therethrough intersecting the end face surface to allow the flow of fluid therethrough, an annular groove in the end face surface providing an annular wall and a first annular surface, said first annular surface extending angularly outward from the annular wall of the annular groove forming a groove angle with respect to a line normal to the centerline axis of the annular groove and intersecting the end face surface of the first connecting member;
a second connecting member having an end face surface on one end thereof shaped to matingly abut the end face surface of the first connecting member and an opening therethrough intersecting the end face surface to allow the flow of fluid therethrough;
means to secure the first connecting member to the second connecting member with the mating end face surfaces of the first and second connecting members in an abutting relationship, at least adjacent to the point of intersection of said first annular surface with said end face surface of said first connecting member such that a portion of the opening of the first connecting member is in communication with a portion of the opening of the second connecting member to allow the fluid to flow therebetween; and
an annular seal ring of relatively rigid material having a plurality of sides, said ring being disposed in the annular groove of the first connecting member, and in its relaxed position a portion of the seal ring protrudes from the groove beyond the end face surface of the first connecting member, the sides of said ring being sized such that when the end face surfaces of the first and second connecting members are secured in an abutting relationship, a portion of a first of the sides of the seal ring sealingly engages the end face surface of the second connecting member, a portion of a second of the sides of the seal ring sealingly engages a portion of the first annular surface formed in the first connecting member and the annular seal ring is twisted in a direction augmenting the sealing engagement between the first of the sides and the end face surface of the second connecting member and augmenting the sealing engagement between the second of the sides and the first annular surface, and a third side of the seal ring being exposed to the fluid flowing between the first and second connecting members such that the fluid pressure augments the sealing engagement between the first side of the seal ring and the first annular surface and the second side of the seal ring and the end face surface of the second connecting member, thereby forming a fluid tight seal between the first and second connecting members, said annular seal ring having an axial width less than the axial depth of the annular groove in the first connecting member, so that the entire axial load resulting from securing the first and second connecting members in an abutting relationship is not carried by the seal ring.

2. The seal assembly of claim 1 wherein the means securing the first and second connecting members in an abutting relationship is defined further to include:
a first flange portion having a plurality of apertures therethrough, extending from the first connecting member;
a second flange portion, having a plurality of apertures extending therethrough, extending from the second connecting member;
a plurality of threaded bolts, each bolt extending through one aperture in each flange portion; and
a plurality of threaded nuts, one nut threaded to each end of each bolt and engaging one of the flange portions, such that as the nuts are tightened on the bolts the flange portions are drawn toward each other thereby drawing the end face surfaces of the first and second connecting members into an abutting relationship.

3. The seal assembly of claim 1 wherein the means securing the first and second connecting members in an abutting relationship is defined further to include:
a first flange portion extending from the first connecting member forming an annular surface around a portion of the first connecting member;
a second flange portion extending from the second connecting member forming an annular surface around a portion of the second connecting member;
a pair of clamp means, each clamp means extending around a portion of the first and second connecting members, and each clamp means having a groove therein forming a pair of annular surfaces therearound, each clamp means being disposed such that one of the annular surfaces engages a portion of the annular surface of the first connecting member and the other annular surface of each clamp means engages a portion of the annular surface of the second connecting member; and
means to secure the pair of clamp means around the first and second connecting members, thereby securing the end face surfaces of the first and second connecting members in an abutting relationship.

4. The seal assembly of claim 1 wherein the means securing the first and second connecting members in an abutting relationship is defined further to include:
a first flange portion extending from the first connecting member having a threaded portion formed on the outer periphery thereof;
a second flange portion extending from the second connecting member forming an annular surface around a portion of the second connecting member;
a coupling means having a threaded portion on one end thereof and an annular surface formed in the opposite end thereof, the coupling means being disposed around a portion of the first and second connecting members and sized such that the threaded portion threadingly engages the threaded portion of the first connecting member and the annular surface of the coupling engages the annular surface of the second connecting member, thereby drawing the first and second connecting members into an abutting relationship as the coupling means is threaded on the first connecting member.

5. The seal assembly of claim 1 wherein the second side of said ring is sized with respect to the first annular surface formed by the groove in the first connecting member, such that when the first and second connecting members are secured in an abutting relationship the seal ring is stressed in a radially inward direction, thereby augmenting the sealing engagement between the second side of the seal ring and the first annular surface of the groove.

6. The seal assembly of claim 1 wherein the second side of said ring extends angularly forming a ring angle with respect to a line normal to the center line axis of the seal ring.

7. The seal assembly of claim 6 wherein the ring angle is less than the groove angle.

8. The seal assembly of claim 1 wherein the annular wall of the groove in the first connecting member intersects the opening in the first connecting member.

9. The seal assembly of claim 1 wherein the third side of the seal ring extends angularly with respect to the center line axis of the seal ring.

10. The seal assembly of claim 9 wherein one end portion of the first side of the seal ring is connected to one end portion of the second side of the seal ring, and one end portion of the second side opposite the end portion connected to the first side is connected to one end portion of the third side of the seal ring, and one end portion of the third side opposite the end portion connected to the second side is connected to one end portion of the first side opposite the end portion connected to the second side.

11. The seal assembly of claim 10 wherein the first side and the second side of the seal ring are connected by a substantially flat portion which extends generally parallel to the center line axis of the seal ring.

12. The seal assembly of claim 10 wherein the first side and the third side of the seal ring are connected by a substantially flat portion which extends generally parallel to the center line axis of the seal ring.

13. The seal assembly of claim 10 wherein the second side and the third side of the seal ring are connected by a substantially flat portion which extends generally normal to the center line axis of the seal ring, thereby permitting the angular disposition of the third side to be varied without substantially varying the axial width of the seal ring.

14. The seal ring of claim 1 wherein a groove is formed in the third side of the seal ring to more efficiently direct the resultant pressure forces to augment the sealing engagement between the seal ring and the first and second connecting members.

15. The seal assembly of claim 1 wherein an annular bead is formed on the first side of the seal ring, said bead being sized to sealingly contact the end face of the second connecting member.

16. The seal assembly of claim 10 wherein an annular bead is formed on the first side of the seal ring generally adjacent the connection between the first side and the third side of the seal ring.

17. The seal assembly of claim 10 wherein an annular bead is formed on the first side of the seal ring spaced radially from the connection between the first and third side of the seal ring.

18. The seal assembly of claim 1 wherein an annular bead is formed on the second side of the seal ring, sized to sealingly engage the first annular surface of the groove in the first connecting member.

19. The seal assembly of claim 10 wherein an annular bead is formed on the second side of the seal ring generally adjacent the connection between the second and third sides of the seal ring, said bead being sized to sealingly engage the first annular surface of the groove.

20. The seal assembly of claim 17 wherein an elastomeric pad is bonded to a portion of the first side of the seal ring between the annular bead thereon and the connection between the first and third sides of the seal ring, said elastomeric pad sized to sealingly engage the end face of the second connecting member.

21. The seal assembly of claim 20 wherein one end of the elastomeric pad is exposed to the pressure of the fluid flowing between the first and second connecting members.

22. The seal assembly of claim 13 wherein an elastomeric pad is bonded to the flat portion connecting the second side and the third side of the seal ring.

23. The seal assembly of claim 22 wherein one end portion of the elastomeric pad is sized to sealing contact the first annular surface of the groove in the first connecting member.

24. The seal assembly of claim 22 wherein one end of the elastomeric pad is exposed to the pressure of the fluid flowing through the first and second connecting members.

25. The seal assembly of claim 24 wherein a portion of one side of the elastomeric pad opposite the side bonded to the flat portion of the seal ring is sized to sealingly engage the wall of the groove in the first connecting member when the seal assembly is in an assembled position.

26. The seal assembly of claim 1 wherein the groove in the first connecting member forms a second annular surface in the first connecting member, the first and second annular surfaces extending generally in an axial direction intersecting the end face surface of the first connecting member.

27. The seal assembly of claim 26 wherein an elastomeric pad is bonded to a portion of the third side of the seal ring, and is sized to sealingly engage the second annular surface of the groove in the first connecting member.

28. The seal assembly of claim 27 wherein one end of the elastomeric pad is sized to sealing contact the wall of the groove in the first connecting member when the seal assembly is in an assembled position.

29. The seal assembly of claim 28 wherein one end of the elastomeric pad is exposed to the pressure flowing between the first and second connecting members.

30. The seal assembly of claim 26 wherein a groove is formed in the first side of the seal ring and an elastomeric seal member is disposed in the groove and sized to sealingly engage the end face surface of the second connecting member when the seal assembly is in an assembled position.

31. The seal assembly of claim 26 wherein a groove is formed in the first side of the seal ring and an elastomeric seal member is bonded to the walls of the groove having an annular bead formed on one side thereof, said annular bead being sized to sealingly engage the end face surface of the second connecting member when the seal assembly is in an assembled position.

32. A seal assembly comprising:
a first connecting member having an end face surface on one end thereof and an opening therethrough intersecting the end face surface to allow the flow of fluid therethrough, an annular groove in the end face surface providing an annular wall and a first annular surface, said first annular surface extending angularly outward from the annular wall of the annular groove forming a groove angle with respect to a line normal to the centerline axis of the annular groove and intersecting the end face surface of the first connecting member;
a second connecting member having an end face surface on one end thereof shaped to matingly abut the end face surface of the first connecting member, and an opening therethrough intersecting the end face surface to allow the flow of fluid therethrough;
means to secure the first connecting member to the second connecting member with the mating end face surfaces of the first and second connecting members in an abutting relationship, at least adjacent to the point of intersection of said first annular surface with said end face surface of said first connecting member, such that a portion of the opening of the first connecting member is in communication with a portion of the opening of the second connecting member to allow the fluid to flow therebetween; and
an annular seal ring having a plurality of sides, said ring being disposed in the annular groove of the first connecting member, and in its relaxed position a portion of the seal ring protrudes from the groove beyond the end face surface of the first connecting member, the sides of said ring being sized such that when the end face surfaces of the first and second connecting members are secured in an abutting relationship, a portion of a first of the sides of the seal ring sealingly engages the end face surface of the second connecting member, a portion of a second of the sides of the seal ring sealingly engages a portion of the first annular surface formed in the first connecting member and the annular seal ring is stressed in a radially inward direction augmenting the sealing engagement between the second side of the seal ring and the first annular surface, and a third side of the seal ring being exposed to the fluid flowing between the first and second connecting members such that the fluid pressure augments the sealing engagement between the second side of the seal ring and the first annular surface and between the first side of the seal ring and the end face surface of the second connecting member, thereby forming a fluid tight seal between the first and second connecting members, said annular seal ring having a maximum axial width less than the minimum axial depth of the annular groove in the first connecting member, so that the entire axial load resulting from securing the first and second connecting members in an abutting relationship is not carried by the seal ring.

33. A seal assembly comprising:

a first connecting member having an end face surface on one end thereof and an opening therethrough intersecting the end face surface to allow the flow of fluid therethrough, an annular groove in the end face surface providing an annular wall and a first annular surface, said first annular surface extending angularly outward from the annular wall of the annular groove forming a groove angle with respect to a line normal to the centerline axis of the annular groove and intersecting the end face surface of the first connecting member;

a second connecting member having an end face surface on one end thereof shaped to matingly abut the end face surface of the first connecting member and an opening therethrough intersecting the end face surface to allow the flow of fluid therethrough;

means to secure the first connecting member to the second connecting member with the mating end face surfaces of the first and second connecting members in an abutting relationship, at least adjacent to the point of intersection of said first annular surface with said end face surface of said first connecting member, such that a portion of the opening of the first connecting member is in communication with a portion of the opening of the second connecting member to allow the fluid to flow therebetween; and an annular seal ring having a plurality of sides, said seal ring being disposed in the annular groove of the first connecting member, and in its relaxed position a portion of the seal ring protrudes from the groove beyond the end face surface of the first connecting member, the sides are sized such that when the end face surfaces of the first and second connecting members are secured in an abutting relationship, a portion of a first of the sides of the seal ring sealingly engages the end face surface of the second connecting member, a portion of a second of the sides of the seal ring sealingly engages a portion of the first annular surface formed in the first connecting member and the annular seal ring is twisted in a direction augmenting the sealing engagement between the first of the sides and the end face surface of the second connecting member and augmenting the sealing engagement between the second of the sides of the seal ring and the first annular surface, thereby forming a fluid tight seal between the first and second connecting members, said annular seal ring having a maximum axial width less than the minimum axial depth of the annular groove in the first connecting member, so that the entire axial load resulting from securing the first and second connecting members in an abutting relationship is not carried by the seal ring.

References Cited

UNITED STATES PATENTS

| | | | |
|---|---|---|---|
| 2,989,209 | 6/1961 | Hersman | 277—170X |
| 2,900,199 | 8/1959 | Logan | 285—363X |
| 2,913,269 | 11/1959 | Brenner et al. | 285—M.S. |
| 3,116,944 | 1/1964 | Parker | 285—E |
| 3,146,006 | 8/1964 | Schmohl | 277—170X |
| 3,171,662 | 3/1965 | Warn et al. | 277—235X |
| 3,340,774 | 9/1967 | Brenneke | 277—170X |
| 3,429,581 | 2/1969 | Himmel | 285—334.4X |

FOREIGN PATENTS

| | | | |
|---|---|---|---|
| 1,185,876 | 1/1965 | Germany | 227—236 |

DAVE W. AROLA, Primary Examiner

U.S. Cl. X.R.

277—170, 235, 236; 285—349, 363